United States Patent [19]

Kubo et al.

[11] 4,380,179
[45] Apr. 19, 1983

[54] ENGAGEMENT DEVICE IN AUTOMATIC TRANSMISSION

[75] Inventors: Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Tokyo, Japan

[21] Appl. No.: 190,034

[22] Filed: Sep. 23, 1980

[30] Foreign Application Priority Data

May 6, 1980 [JP] Japan ................................. 55-58734

[51] Int. Cl.³ ..................... F16H 57/10; F16H 37/08; F16D 65/78
[52] U.S. Cl. ........................................ 74/762; 74/695; 188/71.6; 188/264 E
[58] Field of Search .................... 74/695, 762, 763; 188/264 D, 264 E, 71.6

[56] References Cited

U.S. PATENT DOCUMENTS 3,741,037 6/1973 Piret ................................. 74/789
4,304,153 12/1981 Moroto et al. ................. 74/765 X
4,315,443 2/1982 Kubo et al. .......................... 74/695

*Primary Examiner*—Allan D. Herrmann
*Attorney, Agent, or Firm*—Finnegan, Henderson, Farabow, Garrett & Dunner

[57] ABSTRACT

In an automatic transmission including sun gears, ring gears and a carrier for rotatably supporting a pinion on a shaft, the pinion being adapted to mesh with the sun gear and the ring gear; the improvements comprising a hub extending radially outside of the ring gear and having a friction surface in part of the outer peripheral wall thereof and external spline teeth provided in the other part of the outer peripheral wall, the hub being attached to the carrier; a friction element adapted to engage a cylindrical outer race fitted on internal spline-teeth of a transmission housing and the friction face of the hub; a plurality of first friction plates axially, slidably fitted on the external spline teeth of the hub; and a plurality of second friction plates axially, slidably fitted on the internal spline-teeth of the transmission housing, the first and second friction plates disposed one after another.

4 Claims, 2 Drawing Figures

ENGAGEMENT DEVICE IN AUTOMATIC TRANSMISSION

BACKGROUND OF THE INVENTION

1. Field of the Invention

This invention relates to an engagement device in an automatic transmission, wherein a reduction ratio is automatically changed, so that the drive force of an engine is transmitted to wheels of an automobile.

2. Description of the Prior Art

Known automatic transmission, which include planetary gear units, a brake for controlling connection of a carrier of a planetary gear unit with a stationary member, and a one-way brake provided in parallel to the brake. It is customary in such a prior art automatic transmissions that a support member serving as a stationary member projects radially inwardly from the transmission housing, and an inner race and an outer race of the one-way brake are fixed to the support member and the carrier. Since the support member does not rotate, it is impossible to utilize a centrifugal force of the inner race of the one-way brake, in order to lubricate a sprag serving as a friction element of the one-way brake. For this reason, a seal ring is used for providing an oil passage, so that a lubricant of a given pressure level will be introduced from an oil pump by way of the oil passage into the sprag of the one-way brake.

SUMMARY OF THE INVENTION

It is an object of the present invention to provide engagement device in an automatic transmission, wherein lubrication of a friction element of a one-way brake is achieved without resorting to any special part such as a seal ring.

To attain the above object, there is provided according to the present invention an engagement device which comprises a hub attached to a carrier of a planetary gear unit, the hub extending radially outside of a ring gear of the planetary gear unit and having a friction surface in one portion of the outer peripheral surface thereof and external spline teeth provided in the other part of the outer peripheral surface, a frictional element engaging the friction surface of the hub, a cylindrical outer race fitted on a spline-teeth in a transmission housing, a plurality of first friction plates adapted to be fitted on the external spline-teeth of the hub slidably in the axial direction and a plurality of second friction plates adapted to be fitted on the spline-teeth in the transmission housing slidably in the axial direction, the first friction plates and the second friction plates being disposed one after another. The hub serving as the inner race of the one-way brake is connected to the carrier, so that the hub is rotated along with the carrier. This permits use of a centrifugal force accruing from rotation of the inner race in order to introduce a lubricant to the friction elements of the one-way brake, dispensing with a special part such as a seal ring. The inner race is provided with a radially running hole, which leads to a sliding member of the one-way brake.

Preferably, the first brake includes the first friction plates and second friction plates, and the second brake includes a plurality of third friction plates and a plurality of fourth friction plates which are fitted on the spline teeth in the transmission housing slidably in the axial direction and disposed alternately with the plurality of third friction plates. The second brake is disposed opposite to the first brake with respect to the outer race. A snap ring is fitted between the outer race and the second brake. The outer race also serves as a back plate for the first brake, and the snap ring prevents the axial displacement of the outer race and the back plate of the second brake, with the result of reduction of the number of parts.

The friction element and the end plate portion of the carrier are axially aligned with each other, so that a reduced load is exerted on the friction element, with the result of an increased durability of the friction element.

DESCRIPTION OF THE PREFERRED EMBODIMENTS

Figure 1:
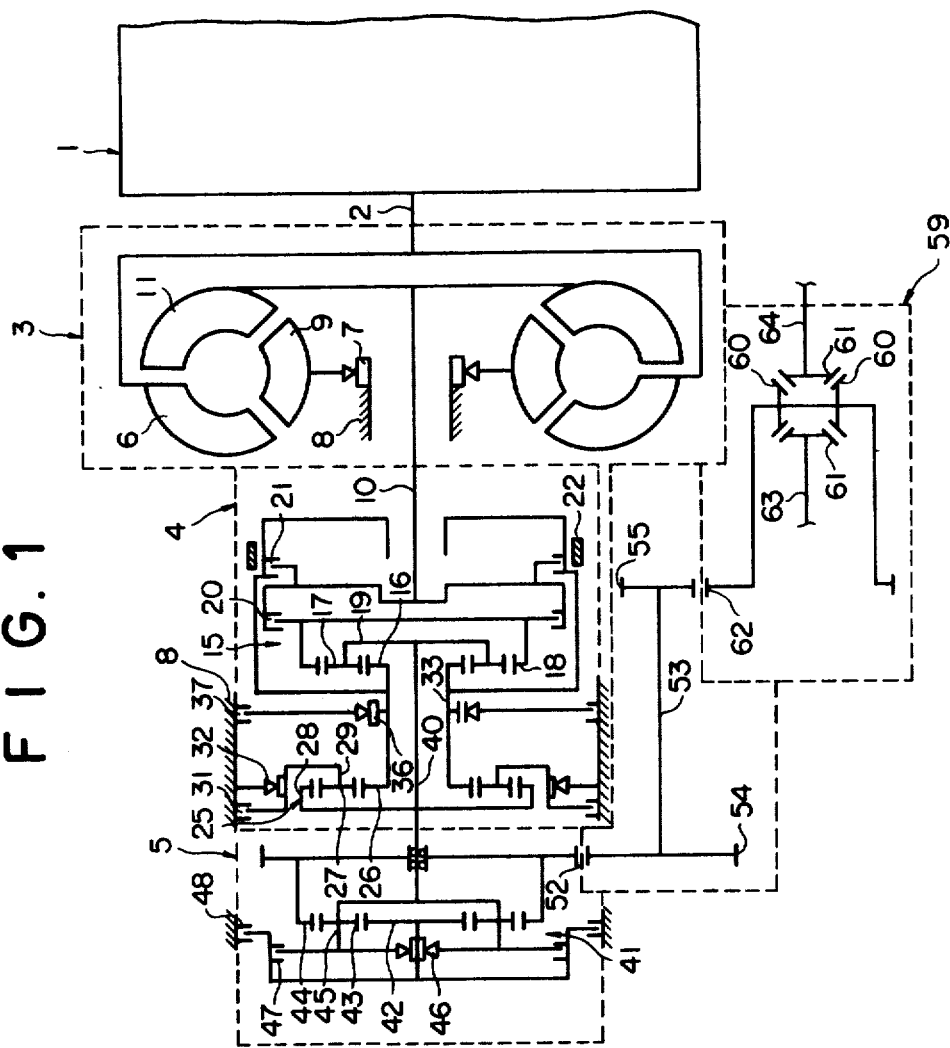
FIG. 1 is a skeleton diagram of an automatic transmission to which the present invention is applied; and, FIG. 2 illustrates the essential part of the engagement device according to the present invention.

An automatic transmission to which the present invention is applied is shown in a skeleton diagram in FIG. 1. An engine 1 has a crank shaft 2 extending transversely of an automobile. A fluid-type torque converter 3, an underdrive unit 4, and an overdrive unit 5 are placed coaxially with the crank shaft 2 in a direction of width of vehicle in the order described, as viewed from the side of the engine. The fluid-type torque converter 3 is equipped with a pump impeller 6 a stator 9 connected by way of a one-way brake 7 to the stationary portion 8, and a turbine 11 coupled to a turbine shaft 10. A planetary gear unit 4 of the underdrive device 15, which is positioned near to the fluid-type torque converter 3, includes sun gears 16, pinions 17, ring gears 18 and a carrier 19 supporting the pinions 17 rotatably. A clutch 20 controls the connection of the turbine shaft 10 serving as the input portion of the underdrive device 4 to the ring gears 18 of the planetary gear unit 15. A clutch 21 controls connection of the turbine shaft 10 to the sun gears 16, and a brake 22 controls the fixing of the sun gears 16. A planetary gear unit 25 located on the side of the overdrive device 5 includes sun gears 26, pinions 27, ring gears 28 and carriers 29 supporting the pinions 27 rotatably. A brake 31 and a one-way brake 32 are provided in parallel to each other, to thereby control connection of the carriers 29 to the stationary portion 8. The sun gears 16 and 26 are mounted on a common sun gear shaft 33. A one-way brake 36 and a brake 37 are provided in series relation to each other to control connection between the stationary portion 8 and the sun gear shaft 33. The carrier 19 and the ring gears 28 are coupled to a counter shaft 40. A planetary gear unit 41 of the overdrive device 5 includes sun gears 42, pinions 43, ring gears 44 and a carrier 45 supporting the pinions 43 rotatably. A one-way brake 46 and a brake 47 are provided in parallel to each other, to thereby control connection between the sun gears 42 and the carrier 45. A brake 48 controls connection of the sun gears 42 and the stationary portion 8, and the carrier is coupled to the counter shaft 40. An output gear 52 is provided in the axially mid portion between the planetary gear units 25 and 41, and connected to the ring gears 44. A transmission shaft 53 extends in parallel to the counter shaft 40 having gears 54 and 55 at the opposite ends thereof. The gear 54 meshes with the output gear 52. A differential device 59 is placed in the central portion in the transverse direction of the vehicle body and includes a pair of deaf pinions 60, a pair of side pinions 61 engaging the deaf pinions 60, and a gear 62 engaging the gear 55 of the transmission shaft 53 and provided on the outer surface of a deaf casing which supports the deaf pinions 60 rotatably. The side pinions 61 are coupled to left and right axles 63 and 64, respectively.

The following table shows the relationship of operations of respective engagement members versue transmission positions accomplished thereby. In the Table, the symbol "O" shows respective components being in engagement, and the symbols "Δ" shows that respective components are brought into engagement when the engine brake is applied. Reference numerals in the Table correspond to those of the engagement members illustrated in FIG. 1, respectively.

| Transmission Position | 20 | 21 | 22 | 31 | 32 | 36 | 37 | 46 | 47 | 48 |
|---|---|---|---|---|---|---|---|---|---|---|
| 1st gear | O | | | Δ | O | | | O | Δ | |
| 2nd gear | O | | Δ | | | O | O | O | Δ | |
| 3rd gear | O | O | | | | | | O | Δ | |
| Overdrive | O | O | | | | | | | | O |
| Reverse | | | | O | | | | | O | |

Figure 2:
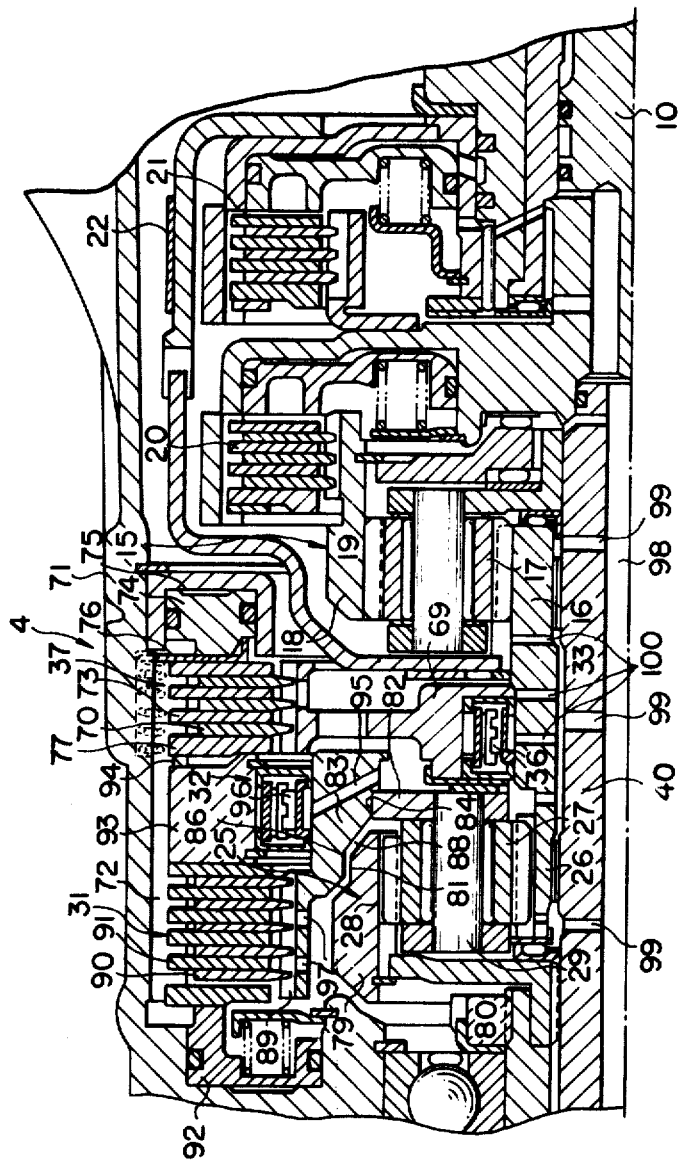

FIG. 2 illustrates the essential part of the engagement device according to the present invention. The sun gear shaft 33 serves as an inner race of the one-way brake 36 as well. The inner peripheral portion of the radially extending rib 69 has a function of an outer race of the one-way clutch 36 as well. The brake 37 includes a plurality of discs 70 serving as friction plates and spline-fitted on the outer peripheral portion of the rib 69, plates 73 serving as friction plates and spline-fitted in a spline groove 72 provided in the inner peripheral wall of the transmission housing 71, a piston 74, a plate 76 adapted to press piston 74 toward a piston chamber 75 under the force of a spring (not shown), and a back plate 77. Ring member 79 having a ring gear 28 of the planetary-gear unit 25 is spline-connected to the outer peripheral portion of the rib 80, the inner peripheral portion of which is spline-fitted on the counter shaft 40. The outer peripheral portion 81 in the end portion near to the rib 69, of the ring member 79, is increased in an outer diameter toward the overdrive unit 5, thereby presenting a divergent contour. The end face portion 82 near to the rib 69, of the carrier 29 is connected at the outer peripheral portion thereof to a step portion 84 provided in the inner peripheral wall of the hub 83. The hub 83 has a given axial length. An inner peripheral contour 86 of the hub 83 conforms to the outer peripheral contour 81 of the ring member 79. The hub 83 surrounds the radially outer peripheral wall of the ring member 79 at a given spacing therefrom and in a manner to define a radially aslant gap 88 by the outer peripheral portion 81 of the ring member 79 and the inner peripheral portion 86 of the hub 83. The gap 88 is suited for causing oil to smoothly flow radially outward of the transmission. The outer diameter of the hub 83 at the axially front differs from that at the axially rear.

The one-way brake 32 is disposed in the outer peripheral portion of the small diameter portion of the hub 83, and the brake 31 is disposed in the outer peripheral portion of the large diameter portion of the hub 83. The one-way brake 32 is so arranged as to locate its central radius is substantially aligned with the central radius of the end face portion 82 of the carrier 29. Since the one-way brake 32 and the end face portion 82 of the carrier 29 are arranged in the above-described positional relationship, a circumferential load can be exerted substantially on the center of the one-way brake, rather than being diverted from the center thereof, thus increasing the durability of the one-way brake.

The brake 31 includes a plurality of discs 90 spline-fitted in a spline 89 provided in the outer peripheral wall of the large diameter portion of the hub 83, a plurality of plates 91 spline-fitted in a spline groove 72, and a piston 92. An outer race 93 of the one-way brake 32 has a radial size substantially corresponding to a size of disc 90 or plate 91 and contacts one of the plates 91 to serve as a back plate therefor, while being spline-fitted into the spline-groove 72. A snap ring 94 is provided between the outer race 93 and the back plate 77 of the brake 37. The snap ring 94 is fitted into an annular groove in axial position in the spline-groove 72, so as to prevent displacement of the back plate 77 and the outer race 93. The snap ring 94 is common to two back plates, with the result of reduction in the number of parts.

The hub 83 has a radially running oil passage 95, the radially inner end of which is open between the end face 82 of the carrier 29 and the rib 69, and the radially outer end of which is led to the sprag 96 of the one-way brake 32. As is apparent from the operations of respective engagement members shown in Table, when the engine is run at the second and third gears, the one-way brake 32 remains in the idling position, with the outer race 93 remaining stationary and with the hub 83 serving as the inner race maintained in rotation. By a centrifugal force accruing from rotation of the hub 83, lubricating oil or cooling oil is supplied via the oil passage 95 into the one-way brake 32 under pressure of a given level, dispensing with a seal ring for retaining an oil pressure for use in supplying oil from the oil pump. Thus, reduction in the number of parts results. Radially running holes 97 serving as oil passages are provided in the large diameter portion of the hub 83. Oil introduced through the gap 88 is then supplied through the holes 97 into the discs 90 and plates 91. Oil fed under pressure from the oil pump is supplied via the axial hole 98 in the counter shaft 40, radially running holes 99 in the counter shaft 40 and a radially running holes 100 in the sun gear 33 into respective sliding members in the underdrive unit 4, for lubrication and cooling of these components.

According to the present invention, the hub 83 serving as the inner race of the one-way brake is connected to the carrier and the hub is rotated when the one-way brake is in disengagement. By such arrangement, use of the centrifugal force accruing from rotation of the hub 83 for supply of oil into the sprag for lubrication and cooling thereof is permitted, without using a special means for retaining oil pressure for the oil pump.

What is claimed is:

1. In an automatic transmission including a housing, a sun gear, a ring gear and a carrier rotatably supporting a pinion on a pinion shaft, said pinion meshing with said sun and ring gears, the improvement comprising:

a hub secured to said carrier and extending radially outside of and axially overlapping said ring gear, said hub having a small diameter portion constituting an inner race and having an axially adjacent large diameter portion having external spline-teeth on the outer peripheral wall thereof, the outer peripheral wall of said small diameter portion having a friction surface thereon;

a cylindrical outer race fitted on internal spline-teeth of said housing and disposed radially outward of and axially aligned with said inner race;

a friction element disposed radially between said inner and outer races for engaging said friction surface on the outer peripheral wall of said small diameter portion and said outer race, said small diameter portion having a radially running hole for conducting lubricating oil into said friction element;

a first brake axially adjacent said outer race, said first brake including a plurality of said first friction plates axially slidably fitted on the external spline-teeth of said large diameter portion and a plurality of second friction plates axially slidably fitted on the internal spline-teeth of said housing, said first and second friction plates being interleaved; and a second brake axially adjacent said outer race opposite said first brake, said second brake including a plurality of third friction plates, and a plurality of fourth friction plates axially slidably fitted on the inner spline-teeth of said housing, said third and fourth friction plates being interleaved.

2. An automatic transmission as defined in claim 1, wherein a snap ring is mounted on said transmission housing between the outer race and said second brake.

3. An automatic transmission as defined in claim 2, wherein the outer race serves as a back plate for the first brake.

4. An automatic transmission as defined in claim 3, wherein said hub is secured to one end plate of said carrier and wherein the central radii of said friction element and said one end plate are in substantial alignment.

* * * * *